(12) United States Patent
Kanai

(10) Patent No.: US 6,564,457 B2
(45) Date of Patent: May 20, 2003

(54) MACHINING METHOD OF VALVE SEAT WITH LASER-CLAD METAL

(75) Inventor: Koichi Kanai, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 50 days.

(21) Appl. No.: 09/961,200

(22) Filed: Sep. 24, 2001

(65) Prior Publication Data

US 2002/0046464 A1 Apr. 25, 2002

(30) Foreign Application Priority Data

Oct. 25, 2000 (JP) .................................... 2000-326094

(51) Int. Cl.⁷ ............................................... B23P 15/00
(52) U.S. Cl. ............................ 29/888.44; 29/888.42; 29/890.122; 123/188.8
(58) Field of Search ................... 29/888.03, 888.42, 29/888.44, 890.122, 557, 527; 219/121.6, 121.66, 121.85; 123/188.8

(56) References Cited

U.S. PATENT DOCUMENTS

| | | | | |
|---|---|---|---|---|
| 5,761,806 A | * | 6/1998 | Adachi et al. | 29/888.46 |
| 5,794,337 A | * | 8/1998 | Adachi et al. | 29/888.44 |
| 5,970,614 A | * | 10/1999 | Adachi et al. | 29/888.44 |
| 5,985,056 A | * | 11/1999 | McCay et al. | 148/511 |

FOREIGN PATENT DOCUMENTS

JP    10-337618    12/1998

* cited by examiner

Primary Examiner—I. Cuda Rosenbaum
(74) Attorney, Agent, or Firm—Foley & Lardner

(57) ABSTRACT

Immediately after a laser-cladding is performed, a control surface is formed by machining the clad metal while an extra metal is left. An intermediate inspection is performed about presence/absence of any defect in the clad metal using the control surface. When a defect is detected, the clad metal is removed, and a laser-cladding is performed again. Since an extra metal where an amount of clad metal required can be secure exists, re-cladding can be made possible.

4 Claims, 5 Drawing Sheets

L2 = APPROX. 0.3mm

US 6,564,457 B2

MACHINING METHOD OF VALVE SEAT WITH LASER-CLAD METAL

BACKGROUND OF THE INVENTION

1. Field of the Invention

The present invention relates to a machining method of a part with a laser-clad metal to be formed with a valve seat portion in a cylinder head of an engine.

2. Description of the Related Art

Aluminum-based alloys which allow lighter weight as compared with steel are used as material for a part for an automobile such as a cylinder head of an engine. However, it is difficult to secure strength in high temperature or abrasion resistance for the aluminum-based alloys. For example, there occurs a problem that an aluminum-based alloy is applied to a portion which is exposed to combustion gas with a high temperature, such as a valve seat portion. As a technique for improving heat resistance or abrasion resistance of a specific portion of an aluminum-based alloy part, there has been known a technique for irradiating laser beam on alloy powder with such an excellent property as excellent heat resistance or excellent abrasion resistance to clad the specific portion with the alloy.

SUMMARY OF THE INVENTION

An inspection is made by an eddy current examination apparatus about whether or not there is any internal defect such as a crack or a pore in the laser clad portion. Since a control surface which has been machined is required for making an exact examination, the eddy current examination is usually performed after a final product shape has been obtained.

When any defect has been detected, it is required to remove a surface layer having the defect in a grinding manner and to clad the portion with another metal. However, after a final product shape has been achieved, an extra metal positioned on a inner peripheral side has been removed, so that an amount of clad metal required can not be secured. That is, even though a defect has been found after the final product shape has been achieved, it is impossible to readjust the final product shape.

A cylinder head of an engine in an automobile generally comprises a plurality of valve seats. In a case that a defect has been detected in only one of these valve seats, even when there is not any defect in the remaining valve seats, the cylinder head must be scrapped as a defective article or product. This is a significant obstruction factor against improvement in production efficiency of a cylinder head.

The present invention has been attained in order to solve the above problems, and an object thereof is to provide a forming method of a part with a laser-clad metal for improving a production efficiency of a valve seat portion in a cylinder head for an automobile.

According to the present invention, immediately after a laser cladding is achieved, the portion is machined to form a control surface while an extra metal remains on an inner peripheral side of a base metal constituting a joint portion between a valve seat portion and a port. An intermediate inspection is made using the control surface about whether or not there is any defect in the clad metal. When a defect is detected, the deposited metal is removed and another laser cladding is achieved. Since there is the extra metal capable of securing an amount of clad metal required, even when a defect has been detected in the intermediate inspection, a readjustment can be made. Therefore, the production efficiency of a valve seat portion in a cylinder head for an automobile can be improved.

DETAILED DESCRIPTION OF THE PREFERRED EMBODIMENT

Figure 1:
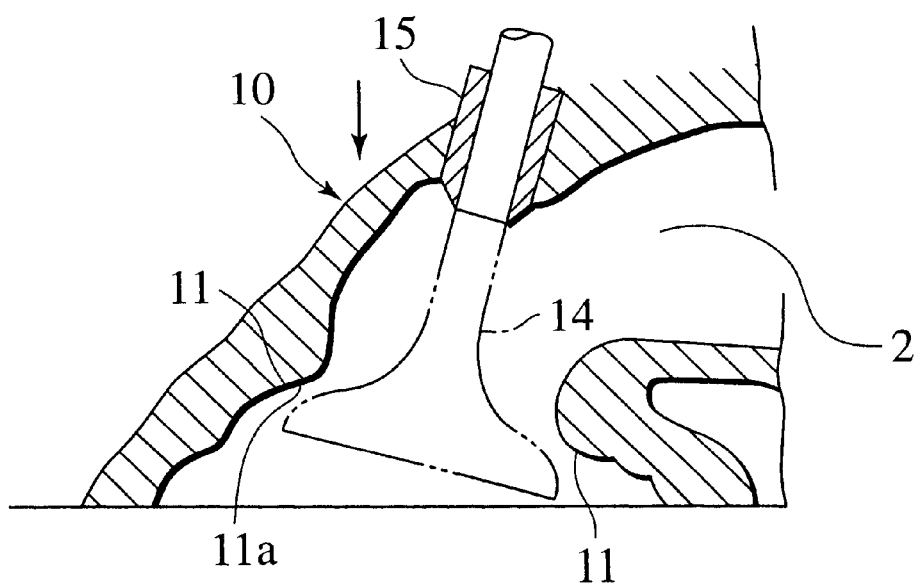
FIG. 1 is a sectional view of a cylinder head of an engine for an automobile.

As shown in FIG. 1, a seat face 11a of a valve seat portion 11 in a cylinder head 10 of an engine for an automobile is put in severe conditions such that a valve 14 positioned at an opening end of a port 12 on a combustion chamber side is repeatedly caused to abut on the seat face 11a, or the seat face 11a is exposed to a high temperature. In a case that the cylinder head 10 is made from aluminum alloy for attaining lightweight, it may become unusable due to wear or melting loss in an extremely short time.

Figure 2:
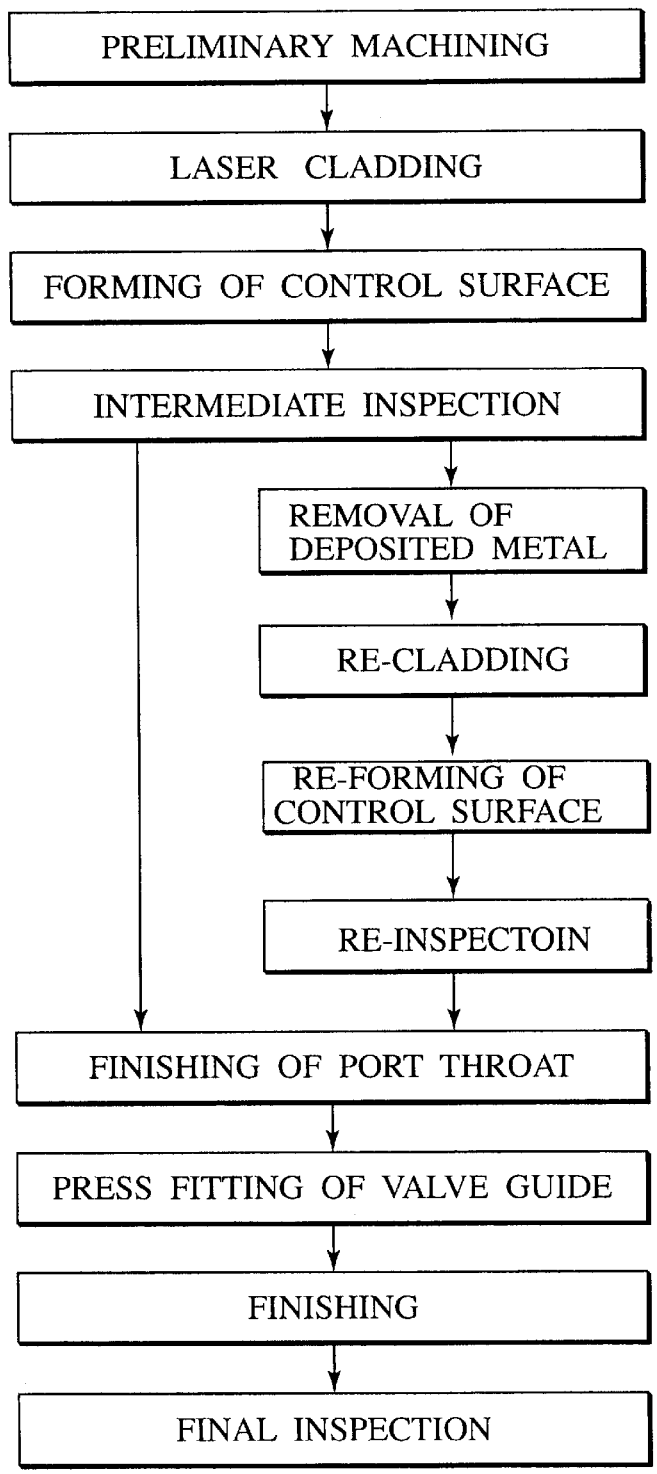
FIG. 2 is a machining method of a part with a laser-clad metal to be formed with a valve seat portion in an embodiment of the present invention.

In order to improve heat resistance or high temperature wear resistance of the seat face, an alloy layer having such excellent properties as a excellent heat resistance, excellent high temperature wear resistance or the like is formed on a surface of a base metal. First, while powder of the alloy is being fed to the seat surface, a clad metal layer is formed by irradiation of laser beam. Next, the clad metal layer is machined so that a seat face 11a is formed. Detailed machining procedure will be shown in FIG. 2.

A process for forming a valve seat portion comprises a pre-machining step, a laser-cladding step, a control surface forming step, an intermediate inspection step (deposited metal removing/laser-re-cladding step), a port throat finishing step, a valve guide press fitting step, a finishing step, and a final inspection step.

Figure 3:
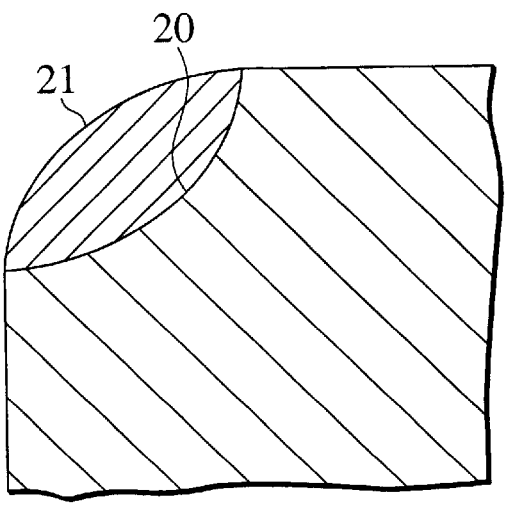
FIG. 3 is a sectional view of a valve seat portion after laser cladding has been achieved in the embodiment of the present invention.

In the pre-machining step, a R-groove machining is performed in an annular shape on a valve seat portion of a cylinder head made of aluminum based cast alloy so that a groove portion 20 shown in FIG. 3 is formed.

In the laser-cladding step, while alloy powder is being fed to a surface of the annular groove portion 20, laser beam is irradiated on the surface so that a deposited metal 21 is formed. As the alloy powder, copper alloy powder from which a deposited metal which is excellent in heat conductivity, wear resistance and corrosion resistance is formed is employed. Alloy composition is Cu-14Ni-3Si-1.5Fe-2Cr-1Al-2V-0.5P, for example. As a laser beam generator, a $CO_2$ laser is used, and has an output of, for example, 3.5 to 3.9 kw. Cladding is performed under such conditions that powder feeding rate is 0.72 g/second and a working speed of cladding is 0.8 m/minute.

Figure 4:
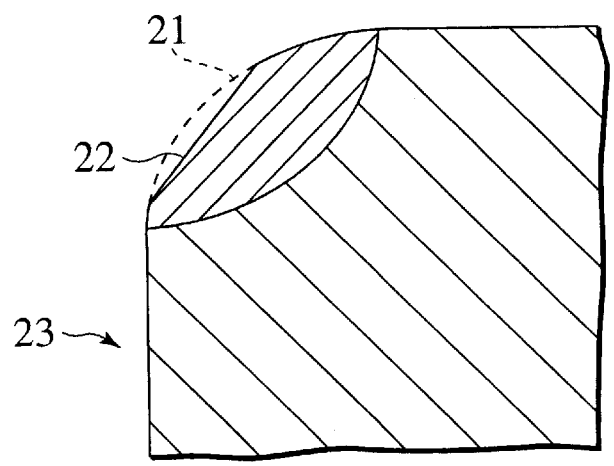
FIG. 4 is a sectional view of the valve seat portion showing a state where a control surface has been formed in the embodiment of the present invention.

The control surface forming step or method will be explained with reference to FIG. 4. In this description, a portion connecting the valve seat portion 11 and the port 12 is called a port throat portion. A control surface 22 is formed by machining the clad metal while an extra metal 23 is left inside a base metal applied for constituting a port throat portion.

Since the extra metal 23 remains even after the control surface has been formed, when any defect has been detected, a laser re-cladding can be performed without any defect of metal lack. Accordingly, production efficiency of a valve seat portion in a cylinder head of an engine can be improved.

The control surface 22 is a taper face with a center angle of 90° about an axial center of a valve 14. This is an optimal face in view of accuracy of defect detection in the intermediate inspection.

Figure 8:
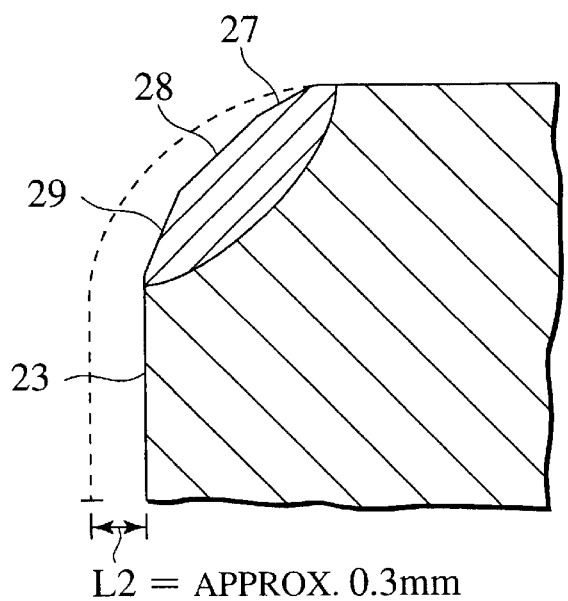
FIG. 8 is a sectional view of a valve seat portion showing a state where a finishing has been completed on a port throat.

For the thickness of the extra metal 23, about 0.3 mm is secured as a machining allowance for a finished shape in order to secure an amount of deposited metal required (refer to FIG. 8).

In the intermediate inspection, presence/absence of a defect is examined using the control surface 22. Since the control surface is a flat surface obtained by machining, present/absence of a defect can be detected at a high reliability. When a defect is detected, the deposited metal is removed and a laser cladding is performed again. When any defect has not been detected, the process advances to the port throat finishing step.

An example of defects is a discontinuous portion such as a crack, a pore in a portion on which the valve 14 or the like. Causes of a defect occurrence are, for example, an excess of an amount of heat input, a lack in an amount of heat input, an original blow hole in a base metal and the like.

When an amount of heat input is excessive, much of an aluminum alloy base metal is melted and copper alloy powder is diluted so that the clad metal is changed to a hard and fragile alloy composition. When an amount of heat input is lacking, the copper alloy powder is not melted sufficiently, thereby causing lack of the copper alloy powder melted into the aluminum alloy base metal. When there is a blow hole in the base metal of aluminum alloy, cutting oil for machining in the pre-machining step remains in the blow hole, and it is gasified by heating in a time of cladding step to form a bubble in molten copper alloy, which causes a cavity called a pore. When the pore exists inside the copper alloy, there does not occur any problem. However, when the pore exists in a portion on which the valve 14 is caused to abut, there occurs a problem.

When re-cladding is performed, the deposited metal 21 in which a defect has been detected is removed. In the step, the alloy layer 24 is removed because, in many cases, the alloy layer 24 in which copper alloy has been melted contains pores 26, so that such a possibility is high that some of the pores 26 remains in the alloy layer 24 even when a re-cladding has been performed. On the other hand, the re-melted layer 25 is left since structure defects such as blowholes or the like in the re-melted layer 25 are reduced by re-melting and solidification.

That is, in the removal of the deposited metal 21, while the alloy layer 24 positioned at a boundary layer between the deposited metal 21 and the base metal is removed, the re-melted layer 25 produced on the base metal due to heat effect is left, so that defect occurrence after the re-cladding can be suppressed.

Figure 5:
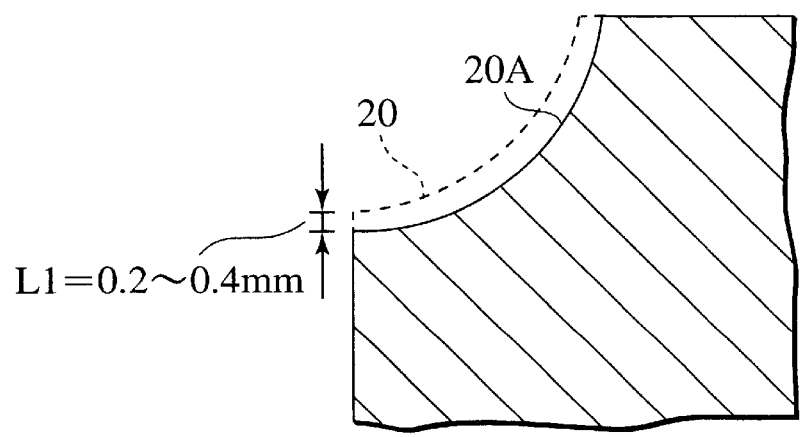
FIG. 5 is a sectional view of the valve seat portion after the deposited metal has been removed in a grinding manner in the embodiment of the present invention, where a face 20a has been exposed by grinding the deposited metal from a boundary 20 between the clad metal and the base metal towards the base metal by 0.2 to 0.4 mm.
Figure 6:
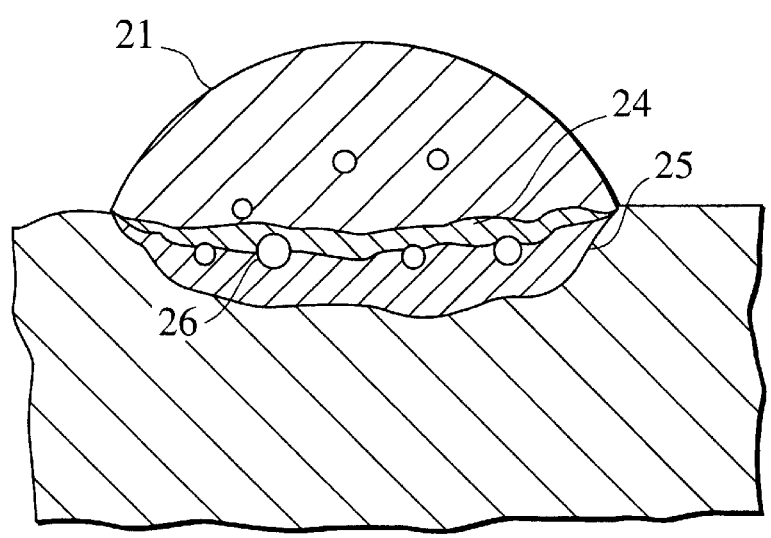
FIG. 6 is one example of a sectional view of a laser-clad metal layer including pores therein.
Figure 7:
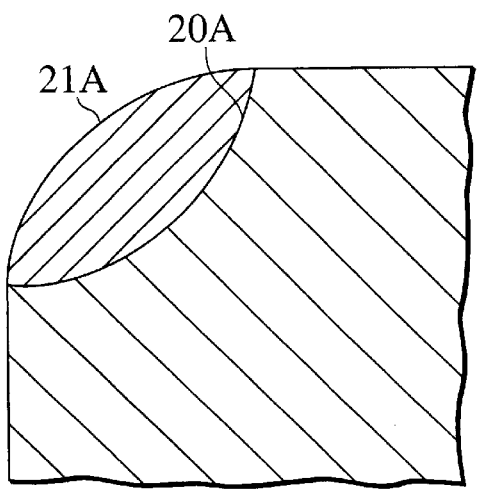
FIG. 7 is a sectional view of a valve seat portion showing one example where a laser adding is performed again.

Particularly, the R groove machining for performing removal in a range of 0.2 to 0.4 mm towards the thickness of the base metal side beyond the groove portion 20 which has been formed by the pre-machining is performed, so that a groove portion 20A shown in FIG. 5 is formed.

A re-clad metal 21A is formed on the surface of the groove portion 20A by conducting laser beam irradiation while alloy powder is being fed. Since the extra metal 23 exists, an amount of deposited metal required can be secured and a defect due to metal lack does not occur.

The re-cladding is performed under such conditions that a laser output is 3.5 to 3.9 kW, a feeding rate of powder is 0.72 g/sec., a working speed of cladding is 0.6 m/min. The reason why the working speed in the re-cladding step is slower than that in the previous cladding step is that more powder is fed to increase an amount of deposited metal for compensating for the removal of the alloy layer 24.

In the port throat finishing step, taper faces 27 to 29 which have center angle 120°, 90° and 30° about an axial center of the valve 14, respectively, are formed and the extra metal is machined so that a port throat portion is formed.

In the valve guide pressure-fitting step, a cylindrical valve guide 15 for guiding reciprocating movement of the valve 14 is pressure-fitted to a hole of the cylinder head 10.

In the finishing step, finishing is performed on the valve seat portion 11 and the valve guide 15 so that a high accuracy in the inner diameter of the valve guide 15 or the surface dimensions of the valve seat portion 11 can be secured. For example, such a finishing or machining is performed that center axes of the valve guide 15 and the valve seat portion 11 are put in a range of a predetermined dimensional accuracy.

In the final inspection step, presence/absence of any defect in the valve seat portion 11 is examined by an eddy current examination apparatus as a final verification for quality assurance.

As mentioned above, in the present embodiment, since an extra metal where an amount of deposited metal required can be secured exist, even when any defect is detected in the intermediate inspection, a cladding can be performed again. Accordingly, the production efficiency of a valve seat portion in a cylinder head of an engine can be improved. Particularly, in a cylinder head having a plurality of valve seat portions, a significant effect can be attained.

The contents of Japanese Patent Application No. 2000-326094 (filed Oct. 25, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A machining method of a part which is laser-clad with a metal adapted to form a valve seat portion in a cylinder head of an engine, comprising:

cladding a base metal by irradiating laser beam while alloy powder is being fed to a surface of the base metal;

machining the clad metal such that an extra metal remains on an inner peripheral side of the base metal constituting a connection part between the valve seat portion and a port and forming a control surface;

performing an intermediate inspection about presence/absence of a defect in the clad metal using the control surface;

removing the deposited metal to perform metal cladding again, when a defect has been detected by the inspection; and obtaining a final product shape by machining.

2. A machining method of a part which is laser-clad with a metal according to claim 1, wherein the control surface is a taper face with a center angle of 90° about an axial center of a valve.

3. A machining method of a part which is laser-clad with a metal according to claim 1, wherein the step of removing the deposited metal includes removing an alloy layer existing between the deposited metal and the base metal and leaving a re-melted layer on the side of the base metal.

4. A machining method of a part which is laser-clad with a metal according to claim 1, wherein the step of removing the deposited metal includes performing removal of 0.2 to 0.4 mm in the thickness direction on the base metal side.

* * * * *